Oct. 15, 1940.    W. S. WATTS    2,217,976
CLUTCH CONTROL MECHANISM
Original Filed Oct. 20, 1933    2 Sheets-Sheet 1

INVENTOR
WILLIAM S. WATTS
BY
ATTORNEY

Oct. 15, 1940.  W. S. WATTS  2,217,976
CLUTCH CONTROL MECHANISM
Original Filed Oct. 20, 1933   2 Sheets-Sheet 2
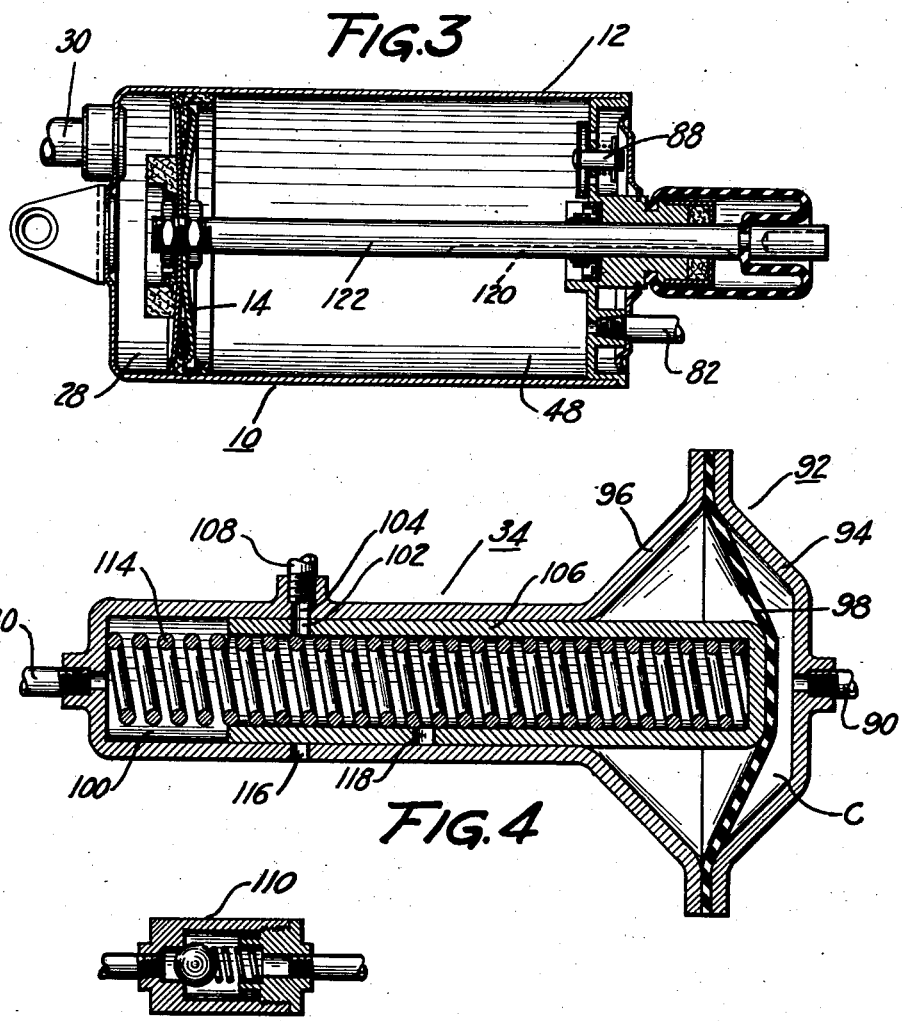
INVENTOR
WILLIAM S. WATTS
BY
H. O. Clayton
ATTORNEY Patented Oct. 15, 1940

2,217,976

UNITED STATES PATENT OFFICE 2,217,976

CLUTCH CONTROL MECHANISM

William S. Watts, South Bend, Ind., assignor to Bendix Aviation Corporation, South Bend, Ind., a corporation of Delaware Original application October 20, 1933, Serial No. 694,437. Divided and this application December 30, 1936, Serial No. 118,367

5 Claims. (Cl. 192—.01)

This invention relates in general to power operated clutch control mechanism for an automotive vehicle, and in particular to means for initiating the clutch disengaging and engaging operations of the mechanism.

This invention is directed to the improvement of the so-called automatic clutch of the present day, wherein the throttle operating means of the vehicle controls the valve mechanism of a manifold vacuum operated motor operably connected to the clutch. In this type of mechanism the power element of the clutch motor is subjected to a varying differential pressure to regulate the disengagement and engagement of the clutch.

One of the well-known commercial types of clutch motors or clutch operators comprises a double-ended cylinder housing a reciprocable piston operably connected to the clutch pedal, wherein there is provided a three-way valve or so-called dump valve constituting part of the aforementioned control valve mechanism. The control valve is preferably operated by the accelerator in such manner as to alternately connect one end of the cylinder with the intake manifold of the engine and to the atmosphere to thereby initiate the clutch disengaging and engaging operations of the motor. Other valve means are provided for controlling the efflux of air from the other end of the cylinder to vary the loading of the clutch plates. One feature of the present invention is directed to the construction and mode of operation of the latter valve means.

To this end there is provided a pressure differential operated bleed valve incorporated in the vent from the last-mentioned end of the cylinder, the valve and the means for operating the same being so constructed and so interconnected with the engine of the vehicle as to reflect the R. P. M. of the engine. This is an important feature, since heretofore the bleed valve has been operated by means, such for example as the manifold vacuum, which is subject to extraneous variables resulting in undesirable fluctuation of the valve. The prior art relating to controlling means for the bleed valve does not suggest clutch operating mechanism including a valve structure such as disclosed by the instant invention, wherein the mechanism provides for a loading of the clutch plates to engage the clutch in such a manner that the loading is proportional to the engine torque.

Yet another object of the invention is to provide a pressure differential actuated clutch operator, wherein the throttle operating means of the vehicle serves as a common control means for the throttle and the control valve mechanism of the clutch operator. To this end there is provided a valve mechanism comprising a three-way or dump valve for initiating the clutch disengaging and engaging operations of the clutch operator, the said valve mechanism being controlled by the operation of the throttle. In the embodiment disclosed, there is also provided the bleed valve referred to above, the same comprising a power operated relay valve of the balanced type to provide a follow-up control of the clutch operator in effecting its clutch engaging operation.

One of the principal objects of the invention is to provide an intake manifold operated vacuum suspended three-way valve mechanism for the clutch motor, the same being automatic in its operation with the opening and closing of the throttle. To this end there is provided a casing member housing at one end a pressure differential operated diaphragm, a valve sleeve member being secured to said diaphragm, the sleeve being telescoped within the casing.

Other objects of the invention and desirable details of construction and combinations of parts will become apparent from the following description of a preferred embodiment, which description is taken in conjunction with the accompanying drawings, in which:

Figure 3 is an enlarged sectional view of the clutch motor of Figure 1;

Figure 4 is an enlarged sectional view of the combined three-way valve and vacuum suspended motor for operating the same; and Figure 5 is a sectional view of the check valve of Figure 1.

Figure 1:
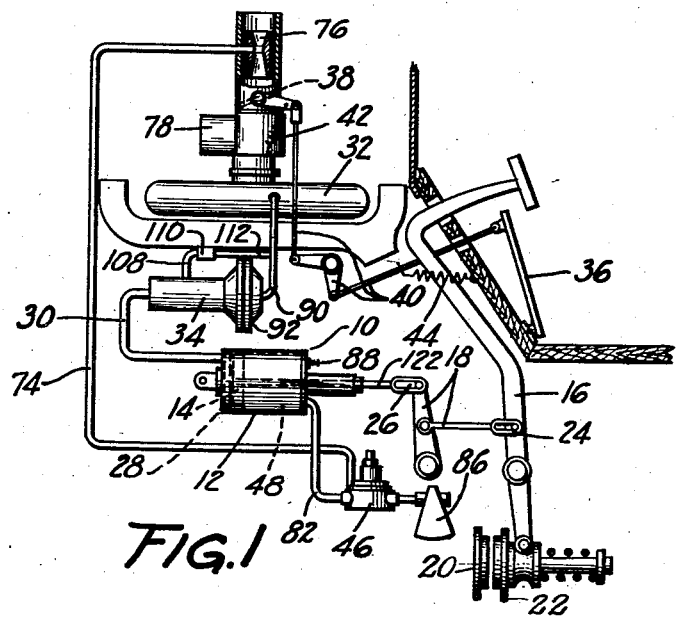
Figure 1 is a diagrammatic view of the preferred embodiment of the clutch control mechanism constituting the present invention.

Referring now to the preferred embodiment of the invention disclosed diagrammatically in Figure 1, there is provided a clutch motor 10 comprising a double-ended cylinder 12, preferably pivotally mounted to a fixed portion of the vehicle, said cylinder housing a reciprocable piston 14 constituting the power element of the motor and operably connected to a clutch pedal 16 by linkage 18. The clutch pedal serves to operate a conventional clutch comprising driving and driven plates 20 and 22 respectively. Pin and slot lost motion connections 24 and 26 provide a means, together with the power mechanism and clutch pedal 16, whereby the clutch may be operated either manually or by power, the connection 24 providing a means whereby the clutch pedal may be depressed without affecting the power means. A left compartment 28 of the cylinder 12 is alternately evacuated and vented to successively initiate a disengagement of the clutch and an engagement thereof by means of a conduit 30 connecting the clutch motor with the atmosphere and with an intake manifold 32 of an internal-combustion engine, not shown, a three-way valve 34 being incorporated in the conduit to effect the aforementioned control. The valve 34 is arranged to be operated indirectly by an accelerator 36 through the intermediary of a throttle valve 38 of the engine, a linkage 40 interconnecting these parts. The operation of the throttle varies the gaseous pressure within the manifold, which, in turn, in large measure controls the operation of the valve 34. Springs 42 and 44 serve to return the throttle valve 38 and accelerator 36 to their respective "off" positions upon release of the accelerator. No claim is made to the aforementioned construction, for the same is disclosed and claimed in the patent to Ross I. Belcia No. 1,470,272, dated October 9, 1923.

Figure 2:
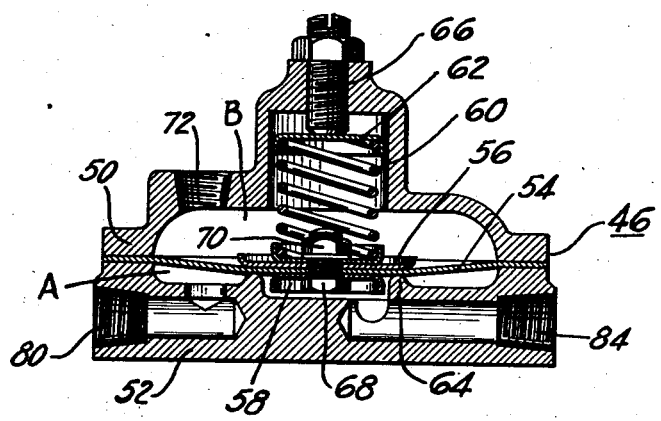
Figure 2 is a sectional view of the bleed valve mechanism of Figure 1.

The invention is, in part, directed to valve means 46 for regualting the efflux of air from a right compartment 48 of the cylinder 12 to thereby control the engagement of the clutch. The valve structure is disclosed in detail in Figure 2 and includes a casing comprising interconnected members 50 and 52, said members housing therebetween a diaphragm member 54 secured in position at its peripheral edge between the casing members. The valve provides chambers A and B to receive respectively the air from the compartment 48 and the air from the intake manifold to be described hereinafter. To the center of the diaphragm 54 are secured cup-shaped washers or retainers 56 and 58. A metal spring 60 is housed between a cup-shaped washer 62 and the washer 56, the spring serving to force the diaphragm 54 into engagement with a raised or land portion 64, constituting a part of the lower casing section 52. A stop member 66 is adjustably mounted in the casing member 58 and abuts the cup-shaped washer 62, providing a means to vary the compression of the spring 60. The diaphragm 54 and members 56 and 58 are clamped together by a bolt 68 and a nut 70. As indicated above, the diaphragm is normally seated, with the engine idling, upon the raised portion 64 integral with the casing member, that portion of the diaphragm contacting the raised portion 64 constituting, together with said latter portion, a bleed or blow-off valve, referred to in greater detail hereinafter. A port 72 in the casing member 50 is connected, by means of a conduit 74, with a Venturi structure 76 mounted at the air intake of a down-draft type of carburetor 78. The chamber A of the bleed valve mechanism is connected, via a valve port 80, with the compartment 48 of the cylinder 12 by means of a conduit 82. To a port 84 in the casing member 50 is secured an inertia operated cut-off valve 86, said mechanism not being claimed herein, inasmuch as the same is disclosed and described in the application of Harold W. Price, Serial No. 622,513, filed July 14, 1932.

Referring now to the operation of the above-described mechanism, with release of the accelerator the throttle is closed to idle the engine, thereby producing, by virtue of the pumping action of the engine pistons, a manifold vacuum of some twenty inches of mercury at sea level. The valve unit 34, with the release of the accelerator, operates to intercommunicate the manifold with the left compartment 28 of the cylinder 12. The compartment 28 is accordingly partially evacuated, the atmosphere acting upon the right side of the piston 14, and entering the cylinder via an inwardly opening check valve 88, serving to move the piston to the left as disclosed in Figure 3 to disengage the clutch.

An important feature of the invention relates to the control valve mechanism 34, the same comprising, in a single unit, a three-way valve mechanism operated by a motor energized by increasing the gaseous pressure within one compartment thereof.

Describing in greater detail the aforementioned operation, when the accelerator is released, the engine idling at the time, there results an evacuation of the clutch motor to disengage the clutch. The valve operating motor comprises casing members 94 and 96 and a diaphragm 98 secured between the valve casings. In this operation the air is drawn from the clutch motor 10 via the conduit 30, a chamber 100 in the valve, ports 102 and 104 in a plunger 106 and the valve casing member 96 respectively, a by-pass conduit 108, check valve 110 and a conduit 112.

When it is desired to engage the clutch, the accelerator is depressed, resulting in a drop in manifold vacuum to increase the gaseous pressure in the chamber C of the motor 92, the resulting differential of pressure acting on the diaphragm 98, moving the plunger 106 to the left, Figure 4, to register an atmospheric port 116 in the valve casing member 96 with a port 118 in the plunger and cut off communication between the ports 102 and 104. The valve 34 is thus closed when the motor 92 is energized by increasing the gaseous pressure within the compartment C thereof. The check valve 110, in part, effects this result by serving to maintain the chamber to the left of the diaphragm 98 partially evacuated. Atmosphere is thus admitted to the clutch motor, via ports 116 and 118 and conduit 30, to initiate the engagement of the clutch. After the clutch is engaged, the fluid pressure within chamber 100 increases until the spring 114 finally overcomes the fluid pressure differential acting on opposite sides of the diaphragm 98 and moves member 106 to the position shown in Fig. 4 where the parts 102 and 104 will be in registry for a subsequent clutch-disengaging operation of motor 10 when the throttle is moved to idling position.

With the venting of the compartment 28, the conventional clutch springs, not shown, immediately act to engage the clutch, the mode of engagement being determined by the mode of efflux of air from the right compartment 48 of the cylinder 12. The air from the compartment passes rapidly from the cylinder, via a slot 120 in a connecting rod 122, effecting a relatively rapid movement of the clutch pedal to take up the clearance between the clutch plates. When the piston 14 and connecting rod have moved to such a position that the slot 120 is either covered by the end wall of the cylinder or lies beyond said wall outside the cylinder, air may no longer pass from the cylinder via the slot; the air, however, continues to rapidly flow from the compartment 48, via the conduit 82, thence into the chamber A of the valve 46, through said valve, which is at this time slightly open owing to the super-atmospheric pressure in the chamber, and out to the atmosphere via the inertia operated valve 86. The valve spring 60 is of such strength as to be compressed by the escaping air to open the bleed valve, said valve remaining open however only until the clutch plates have contacted with a predetermined relatively slight load. When this occurs the relatively high gaseous pressure within the compartment 48 of the cylinder automatically drops, to an amount however substantially above the pressure of the atmosphere, and the spring 60 automatically acts to seat the bleed valve, this operation being known in the art as a lapping of the valve. Thus, whenever the clutch is being engaged, the plates are always initially loaded to a predetermined amount irrespective of the worn-in condition of the clutch facings, said loading depending upon the proportioning of the parts and the strength of the clutch spring and spring 60.

The above-described operation preferably takes place with an opening of the throttle just sufficiently to effect an operation of the three-way valve, the parts of the mechanism being adjusted to effect this result. With a continued depression of the accelerator the throttle is opened to speed up the engine, resulting in a decrease in pressure in the chamber B acting on the diaphragm 54. This pressure, together with the super-atmospheric pressure acting on the lower side of the diaphragm, acts to again crack the bleed valve, that is unseat the diaphragm, permitting a limited amount of air to escape from the compartment A. This may be described as a "blow-off" action of the valve effecting a slight "blowing down" of the clutch motor. The diaphragm 54, however, once unseated acts almost immediately thereafter to seat again, the action being very fast, for the negative pressure developed by the venturi 76 in chamber B is insufficient of itself to overcome the spring 60 once the gaseous pressure of the air in chamber A is reduced by the above-described blow-off action of the bleed valve. With the escape of a limited quantity of air from the compartment 48 of the cylinder, the loading of the clutch plates is correspondingly increased by a predetermined amount in pounds.

Now, if the throttle is further operated, the above cycle of operations is repeated, the loading of the clutch plates being increased by the action of the clutch springs until the system is again in equilibrium, that is when the bleed valve is reseated. It will be noted that the sum of the forces acting to seat the diaphragm 54 and resulting from the additive effect of the pressure in the chamber B and the spring 60 is substantially equal to the force exerted by the pressure within the chamber A when the system is in equilibrium and the bleed valve is seated, and the pressure in chamber B decreases proportionately with the increase in pressure in chamber A. Furthermore, in order to unseat the bleed valve the pressure in chamber A must be increased so that the force resulting from the sum of the loading of the spring 60 and the pressure in chamber B is less than the force exerted by the gas within the chamber A. It therefore follows, that the force exerted by the clutch springs at any given instant after the clutch plates have contacted is directly proportional to the pressure in the chamber B, and therefore directly proportional to the degree of opening of the throttle.

The bleed or blow-off valve is rendered operable by virtue of the evacuation of the chamber B within the valve mechanism. The velocity of air passing through the venturi 76 is effective to draw the air from said chamber through the conduit 74 in accordance with the degree of throttle opening, the latter progressively increasing the air intake via the venturi. Thus the degree of vacuum within the chamber B is increased in direct proportion to the degree of throttle opening. This, however, is exactly the end desired, for the loading of the clutch should be regulated in accordance with the speed of the engine, and the resultant torque of the engine driven clutch plate or flywheel to effect the desired smooth engagement of the clutch and also obviate any possible stalling of the engine.

With the above-described mechanism there is provided in a relatively simple fluid operated clutch operator or so-called automatic clutch the principal advantages of the more complicated centrifugal clutch of the day. Furthermore, it should be noted that the balanced valve mechanism suggested provides the much desired follow-up to-lap type of control of the clutch motor.

The invention heretofore described is disclosed in my copending application Serial No. 694,437, filed October 20, 1933, which has eventuated in Patent No. 2,118,123 dated May 24, 1938, this application constituting a division thereof.

While one illustrative embodiment has been described, it is not my intention to limit the scope of the invention to that particular embodiment, or otherwise than by the terms of the appended claims.

I claim:

1. In a clutch control mechanism for an automotive vehicle provided with a throttle and an internal-combustion engine having an intake manifold, a pressure differential operated clutch operating motor, a three-way control valve mechanism for said motor, means for operating said valve mechanism comprising a motor, means for causing a differential fluid pressure on opposite sides of said motor to move the valve mechanism to such position as to initiate clutch-engaging operation of the clutch motor, and fluid transmitting connections interconnecting said manifold, three-way valve, valve operating motor and pressure differential operated motor, said mechanism being so constructed as to provide an operation of the valve with operation of the throttle to vary the gaseous pressure in the manifold.

2. In a clutch control mechanism for an automotive vehicle provided with a throttle and an internal-combustion engine having an intake manifold, a pressure differential operated clutch operating motor, a three-way control valve mechanism for said motor including a ported casing member and a ported sleeve member telescopingly mounted within said casing, means for operating said valve mechanism comprising a motor, means for causing a differential fluid pressure on opposite sides of said motor to move the valve mechanism to such a position as to initiate clutch-engaging operation of the clutch motor, and fluid transmitting connections interconnecting said manifold, three-way valve, valve operating motor and pressure differential operated motor, said mechanism being so constructed as to provide an operation of the valve with operation of the throttle to vary the gaseous pressure in the manifold.

3. In a clutch control mechanism for an automotive vehicle, a three-way control valve mechanism for said motor comprising a ported tubular portion, a diaphragm housing secured to one end of said tubular portion, a diaphragm operated sleeve valve member reciprocably mounted within said tubular member, and a yieldable member housed within said sleeve member and abutting one end of said tubular member.

4. In a clutch control mechanism provided with a clutch-operating pressure differential operated motor, valve means for controlling the operation of said motor comprising relatively movable valve members, a motor energized, to close the valve and thereby initiate a clutch engaging operation of the motor, by increasing the gaseous pressure within a compartment thereof, means for operating at least one of said valve members comprising a motor, means for causing a differential fluid pressure on opposite sides of said motor to move said last named valve member to such position as to initiate clutch-engaging operation of the clutch motor, said motor comprising a casing and a diaphragm member permanently secured to said casing, and means interconnecting said diaphragm member with one of said valve members.

5. Clutch control mechanism for operating the clutch of an automotive vehicle provided with a fluid motor for controlling the engagement and disengagement of the clutch, said mechanism comprising a casing, a diaphragm within said casing, valve means for controlling said motor comprising a valve member secured to said diaphragm, and a yieldable member housed within said casing and valve member, said parts being so constructed and arranged as to provide a unitary valve and an operating motor therefor, and means for causing a differential fluid pressure on opposite sides of the last named motor to move the valve member to such position as to initiate clutch-engaging operation of said fluid motor.

WILLIAM S. WATTS.